United States Patent
Levis et al.

[11] Patent Number: 5,829,858
[45] Date of Patent: Nov. 3, 1998

[54] PROJECTOR SYSTEM WITH LIGHT PIPE OPTICS

[76] Inventors: Maurice E. Levis, 35 Mizzen Cir., Hampton, Va. 23664; Helen Gourley, 389 San Benito Way, San Francisco, Calif. 94127

[21] Appl. No.: 829,199

[22] Filed: Mar. 31, 1997

Related U.S. Application Data

[63] Continuation-in-part of Ser. No. 801,438, Feb. 18, 1997, abandoned.

[51] Int. Cl.$^6$ .................................................. G03B 21/14
[52] U.S. Cl. ........................... 353/122; 353/98; 359/894; 385/146
[58] Field of Search ................................. 353/38, 98, 99, 353/122; 359/894, 900, 503; 385/146, 132, 131, 130, 147, 48, 123

[56] References Cited

U.S. PATENT DOCUMENTS

| | | | |
|---|---|---|---|
| 3,170,980 | 2/1965 | Pritchard . | |
| 3,774,995 | 11/1973 | Perret . | |
| 3,913,872 | 10/1975 | Weber | 355/67 |
| 4,045,133 | 8/1977 | Carlson | 355/1 |
| 4,681,414 | 7/1987 | Hershel | 353/102 |
| 4,813,765 | 3/1989 | Negishi | 385/146 |
| 5,059,013 | 10/1991 | Jain | 359/503 |
| 5,146,248 | 9/1992 | Duwaer et al. | 353/98 |
| 5,504,627 | 4/1996 | Kim et al. . | |
| 5,625,738 | 4/1997 | Magarill | 385/146 |
| 5,634,704 | 6/1997 | Shikama et al. | 353/31 |
| 5,696,865 | 12/1997 | Beeson et al. | 385/146 |

OTHER PUBLICATIONS

"A Uniform Rectangular Illuminating Optical System For Liquid Crystal Light Valve Projectors", Chang et al, *Euro Display '96*, pp. 257–260.

*Primary Examiner*—William Dowling
*Attorney, Agent, or Firm*—Eliot S. Gerber

[57] ABSTRACT

A projector system includes a lamp, a reflector collector optic, relay optics to image the light from the light pipe exit pupil to the image gate, a light pipe and an image forming means such as a film gate or an LCD (Liquid Crystal Display) panel. The light pipe has a round or octagonal entrance pupil, reflecting internal walls, is tapered in shape, and has a rectangular exit pupil which is larger than a center section in cross-section. The light pipe mixes the light, by internal reflection, and produces light which is uniform in color and intensity across the exit pupil.

35 Claims, 13 Drawing Sheets

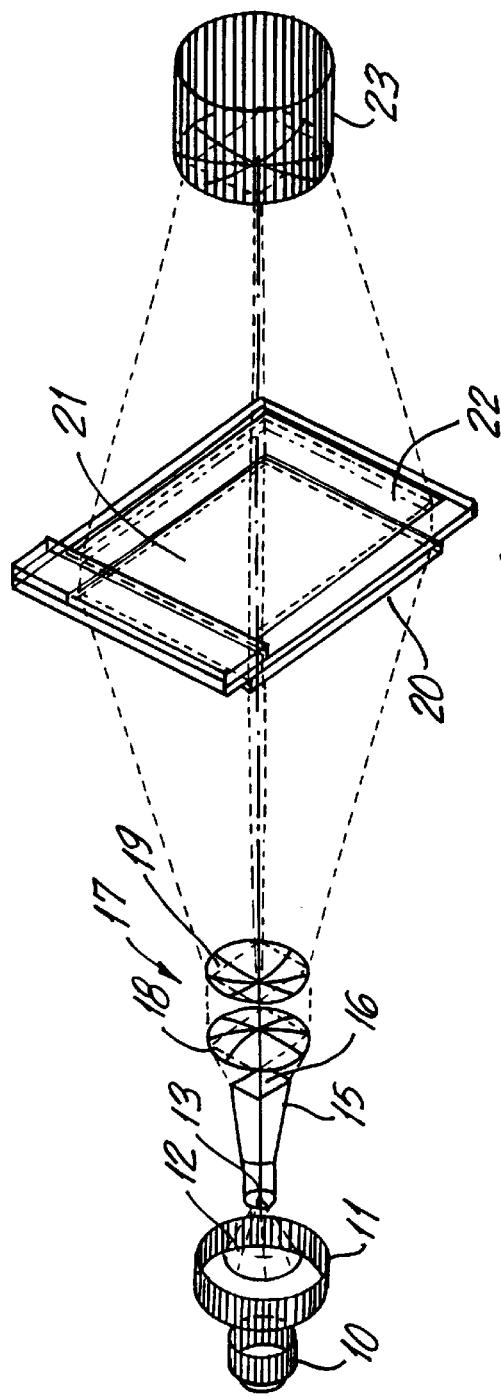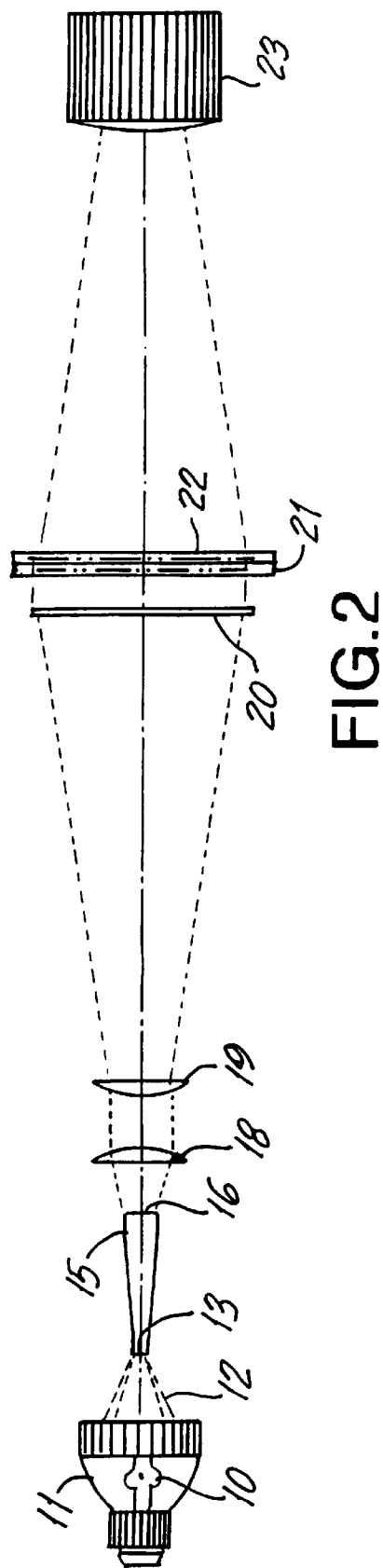

for $i_z = 40° - 100°$ $e = 0.70$
for $i_z = 110° - 130°$ $e = 0.75$

| PANEL SIZE (diagonal in mm) | 33 (1.3") | 51 (2.0") | 76 (3.0") |
|---|---|---|---|
| ARC GAP SIZE (mm) | 1.6 | 1.6 | 1.6 |
| MAGNIFICATION at e=0.75 is ×6.2 at i(1)=40 degrees: D(i) in mm | 10 | 10 | 10 |
| TAPERED LPI DIAGONALS RATIOS R(D) | 3.3 | 5.1 | 7.6 |
| TAPERED LPI DIAGONALS MAX CONE ANGLE f# RATIO R(f) | 2.6 | 4.0 | 5.9 |
| MAXIMUM USEFUL f# at LPI in | 3.5 | 3.5 | 3.5 |
| MAXIMUM ACCEPTED f# at LPI | 1.35 | 0.88 | 0.59 |
| MAXIMUM ACCEPTED ANGLE at LPI in (degrees) | 20.3 | 29.6 | 40.3 |
| CONE ANGLE at i(E)=120 for e=0.75 (degrees) | 28 | 28 | 28 |
| ARC GAP SIZE (mm) | 3.0 | 3.0 | 3.0 |
| MAGNIFICATION at e=0.75 is ×6.2 at i(1)=40 degrees: D(i) in mm | 15 | 15 | 15 |
| TAPERED LPI DIAGONALS RATIOS R(D) | 2.2 | 3.4 | 5.1 |
| TAPERED LPI DIAGONALS MAX CONE ANGLE f# RATIO R(f) | 1.7 | 2.6 | 4.0 |
| MAXIMUM USEFUL f# at LPI in | 3.5 | 3.5 | 3.5 |
| MAXIMUM ACCEPTED f# at LPI in | 2.1 | 1.3 | 0.88 |
| MAXIMUM ACCEPTED ANGLE at LPI in (degrees) | 13.4 | 21.0 | 29.6 |
| CONE ANGLE at i(E)=120 for e=0.70 (degrees) | 34 | 34 | 34 |

FIG.25

PROJECTOR SYSTEM WITH LIGHT PIPE OPTICS

RELATED APPLICATION

This application is a continuation-in-part application based upon Ser. No. 08/801,438, filed Feb. 18, 1997, entitled "Projector System With Light Pipe Optics", now abandoned.

FIELD OF THE INVENTION

The present invention relates to optics and more particularly to the light engine of an optical projector system.

BACKGROUND OF THE INVENTION

At the present time optical projector systems are widely used in business, educational and consumer applications. For example, slide and motion picture projectors are used to show images from film on screens; projection TV may use one or three LCD panels (Liquid Crystal Display) (LCLV—Liquid Crystal Light Valve) and other projectors may use a computer-controlled LCD. The light for projector systems is provided by a "light engine" which generally consists of a light source, for example, a light bulb, a reflector and one or more lenses to direct the light on the "image gate" such as an LCD panel or film gate. In general it is desirable that the light engine have the following characteristics: (1) the light it provides should be bright; (2) the light engine should not produce heat in excess of its ability to be cooled, for example, by a fan, in order to conserve the life of its bulb and other components; (3) it should produce white light without color spots, which is especially a problem in metal halide arc lamps; (3) the light should be spread evenly over the image gate. Often, in commercial light engines, the light in the center may be at 100% but the light in the four corners may be less than 60%; (4) the light engine should be physically as small and as low in cost as feasible.

This is an old and crowded field of technology. Hundreds, and possibly thousands, of patents and articles have been written and many types of light engines have been commercially produced. Nevertheless, there still exists a need for an improved light engine for projector systems. Such an improved light engine would spread the light evenly so that the light in the corners of a rectangular image gate ("corner illuminance") is at least 70% of the light at the gate's center; the colors from the lamp are homogenized to produce uniform white light without color spots; and there is reduced wasted light due to "spillage" (light beams which fall outside of the image gate).

In the article "An Uniform Rectangular Illuminating Optical System For Liquid Crystal Light Valve Projectors", Chang et al, *Eurodisplay* '96, pgs. 256–260, light from a short arc lamp is gathered by an elliptical reflector and transmitted through a RPGR (Rectangular Pillar-Like Glass Rod) and then through two lenses to a LCLV (Liquid Crystal Light Valve). The RPGR, which is a type of light pipe, acts "as a scrambler to transform the circular light profile into a rectangular one and to modify the intensity distribution". The size and exact shape of the RPGR are not stated.

U.S. Pat. No. 3,774,995 (Class 359-869) discloses a reflector having sections of the surface with different curvatures, including an ellipse.

In U.S. Pat. No. 5,504,627 to Kim et al, entitled "Projection Exposure System", a light source illuminates a fly's eye lens, a condenser lens and a mask used in a photolithography process. In one embodiment what is called a "light pipe", in the form of a ring, is used with a conic reflective mirror to transmit the received incident light.

SUMMARY OF THE INVENTON

In accordance with the present invention there is provided a novel and improved light engine for projector systems. The projector system may include the following conventional portions: a light source, such as an arc lamp, a reflector, relay optics such as one or more lenses, an image gate such as a film gate or LCD panel, and a projector lens alone or with field optics. The light engine includes the lamp, reflector and relay optics. In addition, the present invention provides a novel collector-reflector assembly which forms the light from the reflector into a cone, instead of another beam shape, and a tapered light pipe LPI (Light Pipe Integrator). The reflector is formed as a continuous mirror curved surface which comprises two, or more, ellipses having different eccentricities (e) and focal points (F). The ellipses are cross-sections in planes through the reflector's optical axis; but cross-sections of the reflector perpendicular to its optical axis are circles. The truncated end of the light cone is positioned on the entrance pupil of the light pipe. The relay optics are positioned between the exit pupil (exit face) of the light pipe and the image gate. In some embodiments the relay optics may be omitted and the exit pupil may be positioned directly proximate the image gate.

The light pipe integrator (LPI) functions on the principle of internal reflection. It is preferably hollow with mirror interior walls (internal reflection) but may be a solid piece of glass or other transparent material (total internal reflection). It is held in a holder, which, if the LPI is solid, uses transparent plastic screw points, so that the holder touches the solid light pipe only in a few points. The entrance pupil (entrance face) of the light pipe receives the conical beam from the collection optic. The entrance pupil may be flat, hemispherical, conical; and, if flat, may be round or octagonal in a cross-sectional vertical to the optical axis, to best match the truncated cone shape of the light beam. The term "profile" means in a plane through the optical axis and the term "cross-section" means in a plane vertical to the optical axis. The exit pupil (exit face) of the light pipe is flat in a cross-section and has the shape and aspect ratio of the rectangular image gate, for example, the LCD panel. This aspect ratio is typically 4:3, although other aspect ratios may be utilized, such as HDTV's (High Definition Television) image gate aspect ratio of 9:16.

Metal halide arc lamps produce a plasma arc having separate color zones at various distances out from the optical axis. The light pipe integrator integrates the colors from the arc lamp and produces a homogenized, uniform color temperature for white light at its exit pupil. The light pipe also provides a rectangular exit face that may exactly fit the image gate aperture (aspect ratio and shape), thus substantially reducing the amount of light lost in spillage. The light pipe gives an excellent distribution of light over the image gate, easily resulting in corner illuminance (ANSI) of 70% of center, which is a major image quality enhancement over presently commercially available light engines. The light pipe, and the multiple-ellipse reflector (collector optic), called "VAREX" (TM of Torch Technologies LLC), improves color uniformity, light uniformity and collection efficiency.

A straight rectangular (cross-section) light pipe is not used because the cone angle distribution ("angle population") of the incoming light cone from the light source sets the cone angle distribution of the outgoing cone. It is desirable that the outgoing beam cone angle population be reduced. The goal is to match the required angle population of the image gate, i.e., the LCLV. The preferred shape of the light pipe is composed of an entrance tapered section, a narrow center section and an exit tapered section. The wide part of the taper of the exit tapered section is toward the image gate. The entry tapered section has the wide part of the taper facing the light source. Such a double tapered light pipe, called "V-8" (TM of Torch Technologies LLC) produces the desired reduction in the angle population of the outgoing beam cone and reduces the geometric extent, which results in the reduction of the physical length of the light engine.

A preferred embodiment of a light pipe is a hollow light pipe with a two tapered section shape, an entry pupil, a center section, which is square or round in cross-section, and a flat rectangular exit pupil of the chosen aspect ratio. Another preferred embodiment is a hollow light pipe with parabolic or other curved shaped walls, a round and flat entrance pupil, a flat rectangular exit pupil, and a taper opening up towards the image gate. Another preferred embodiment has a flat and octagonal entry pupil and a flat and rectangular exit pupil.

BRIEF DESCRIPTION OF THE DRAWING

In the accompanying drawing of the present invention, the figures are described as follows:

FIG. 1 is a perspective view of the projector system of the present invention;

FIG. 2 is a top view of the projector system of FIG. 1;

(y axis) against ratio of cone angle f#s $$\left( R_f = \frac{f_p}{f_c} \right)$$

Figure 5:
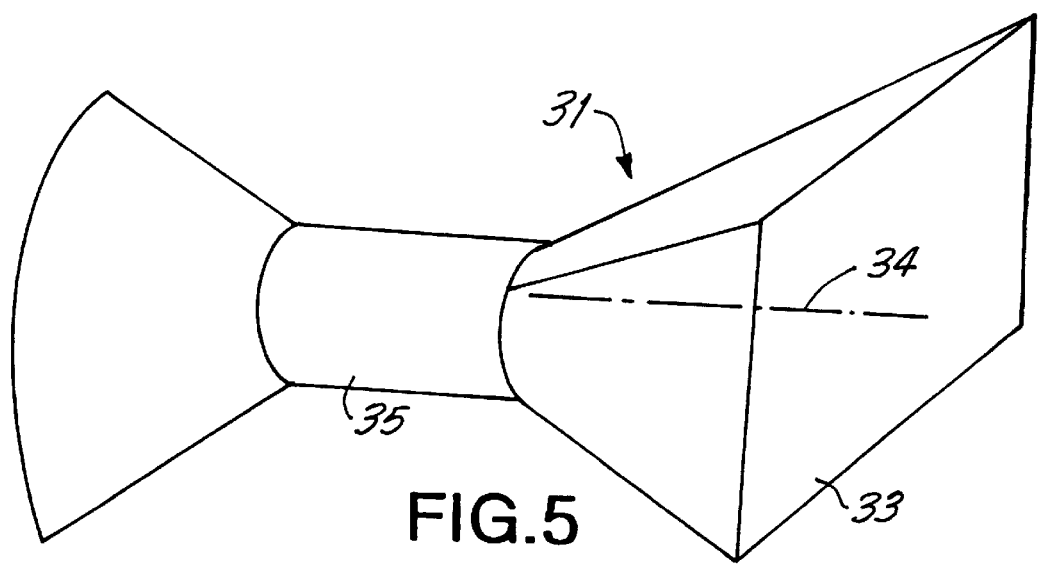
FIG. 5 is a perspective view of a third embodiment of a light pipe of the present invention.
Figure 21:
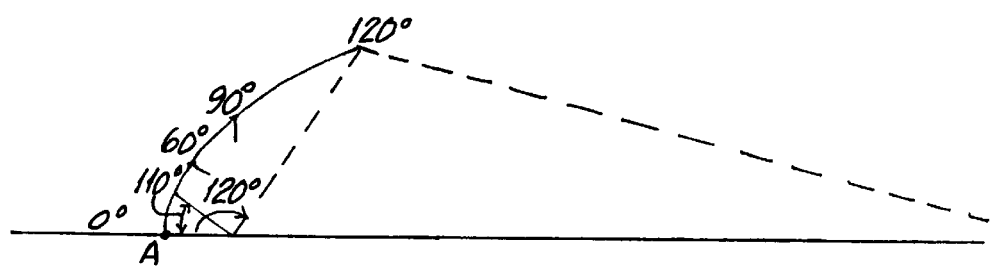
Figure 18:
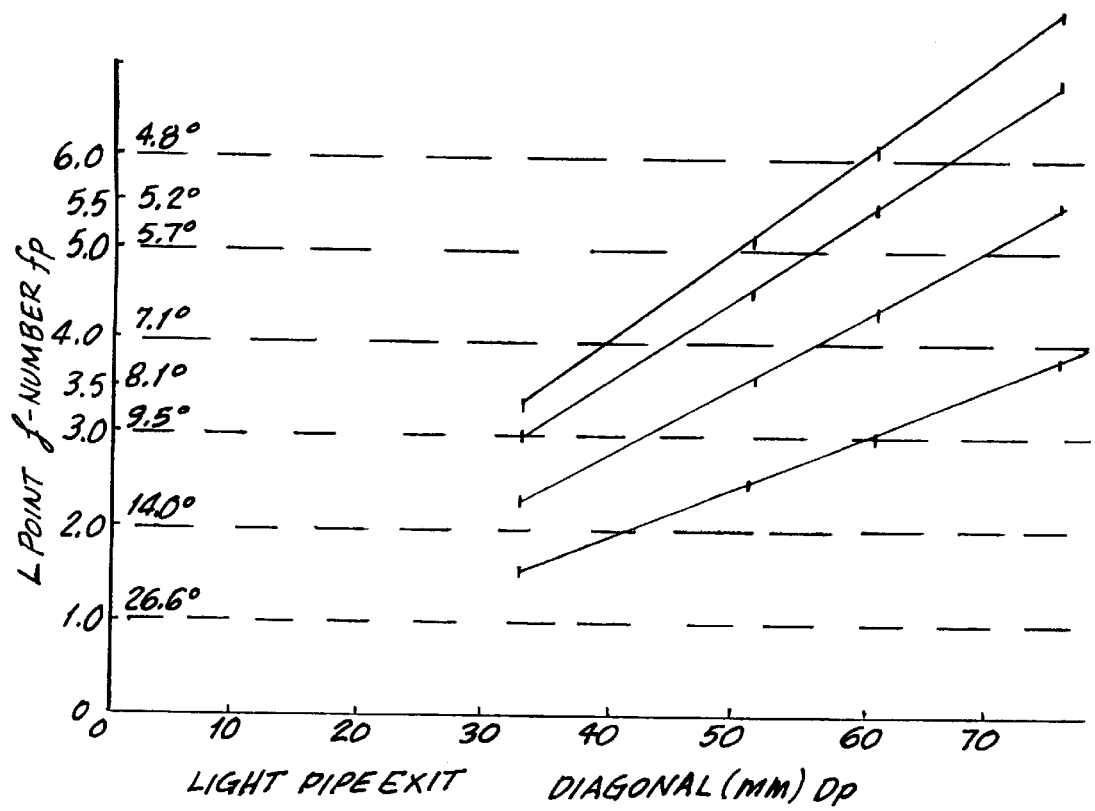
Figure 19:
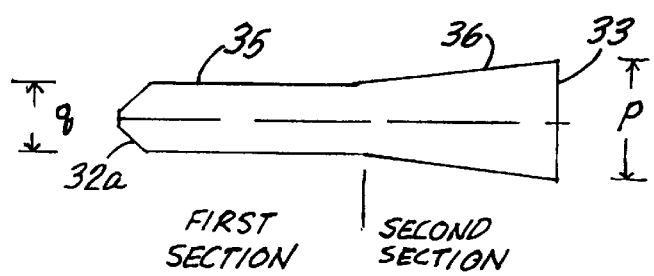
Figure 20:
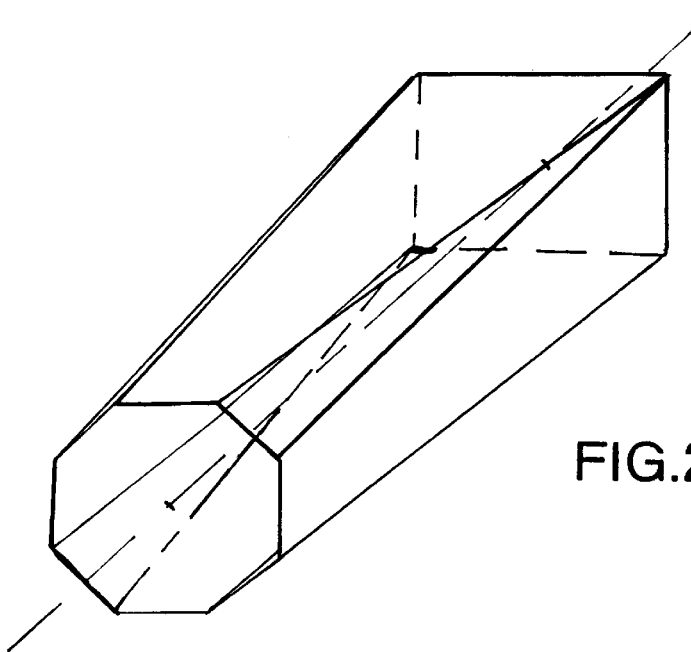
Figure 22:
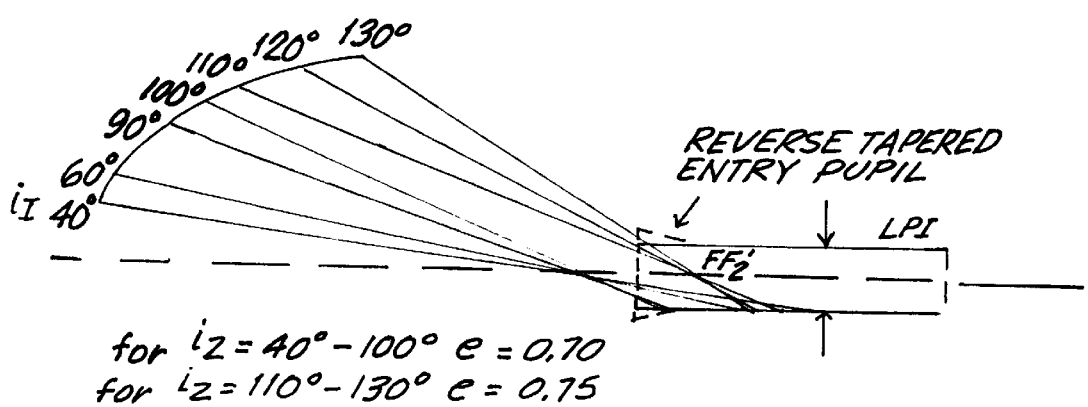
Figure 23:
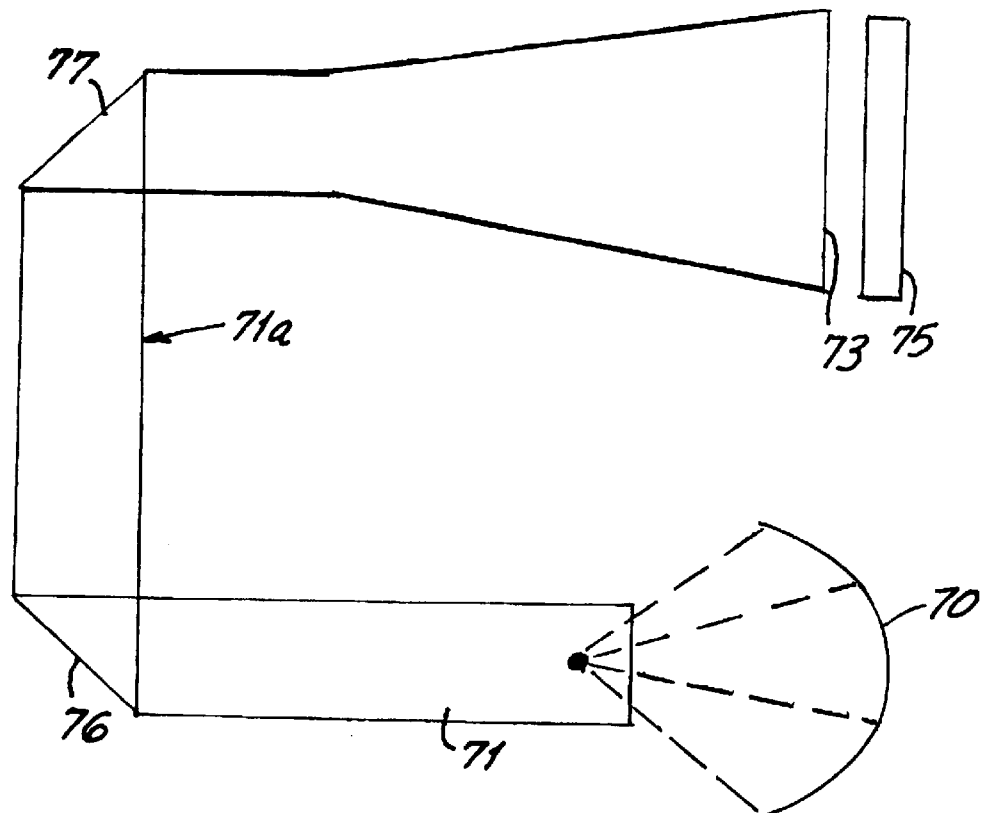
Figure 24:
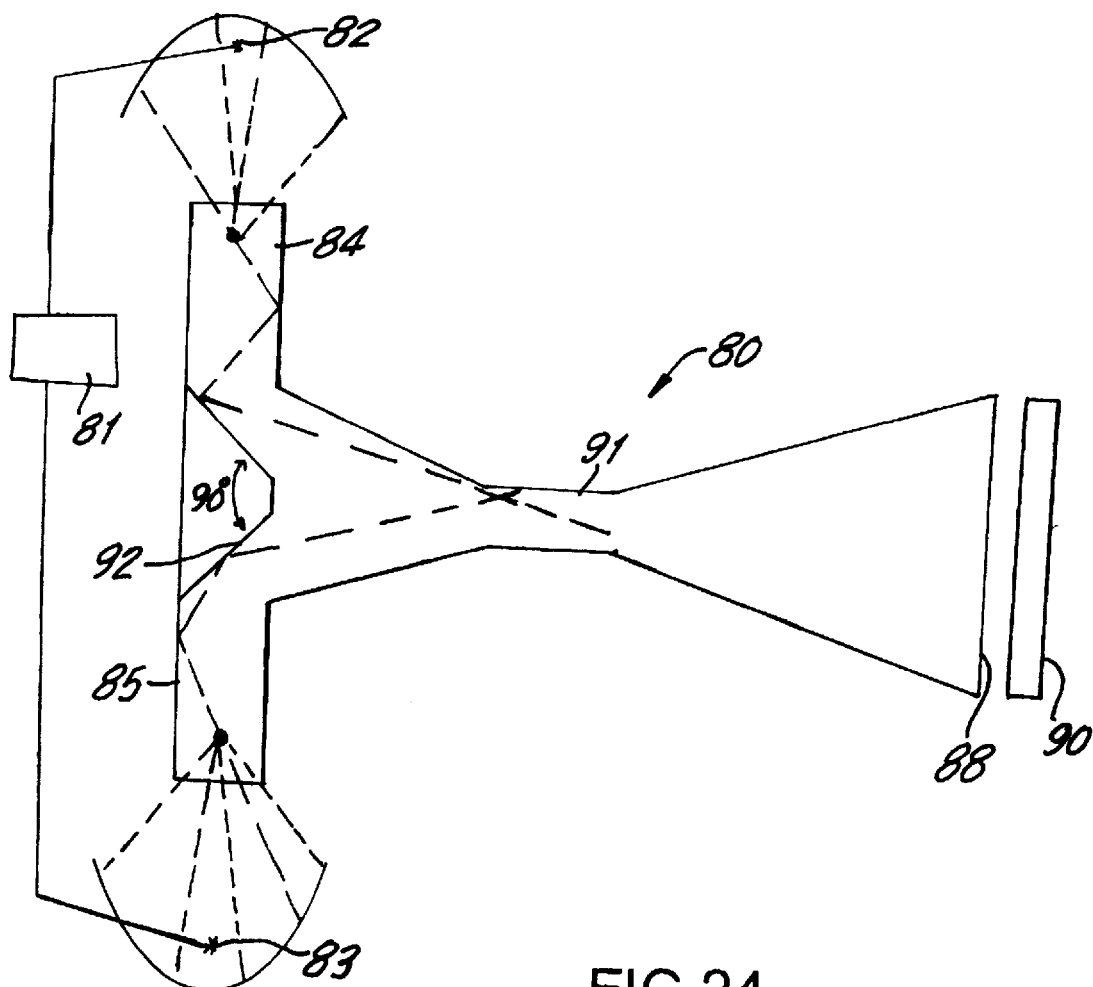

(x axis) where p is the exit pupil having a rectangular shape in the ratio 4:3 and c is the entry pupil having a round shape;

FIG. 18 is a chart plotting the f number at the exit pupil (1.0–6.0) (left scale) at various entrance cone f#s (1.0 to 2.0) of a LPI (Light Pipe Integrator) (y axis) against the exit pupil diagonal size in mm (x axis) for an entry pupil round in shape and 16 mm diameter ($D_c$);

FIG. 19 is a side cross-sectional view of a preferred embodiment of the LPI, similar to FIG. 5;

FIG. 20 is a perspective view of a tapered LPI having a octagonal entry pupil and a rectangular exit pupil;

FIG. 21 is a cross-sectional view of a multiple eccentricity e set of ellipsical curves forming a continuous surface to provide a constant magnification;

FIG. 22 is a cross-sectional view of a double eccentricity elliptical curve;

FIG. 23 is a side view of a light engine using a curved LPI;

FIG. 24 is a perspective view of a double-lamp light engine for use with a motion picture film gate;

FIG. 25 is Table 1; and

Figure 26:
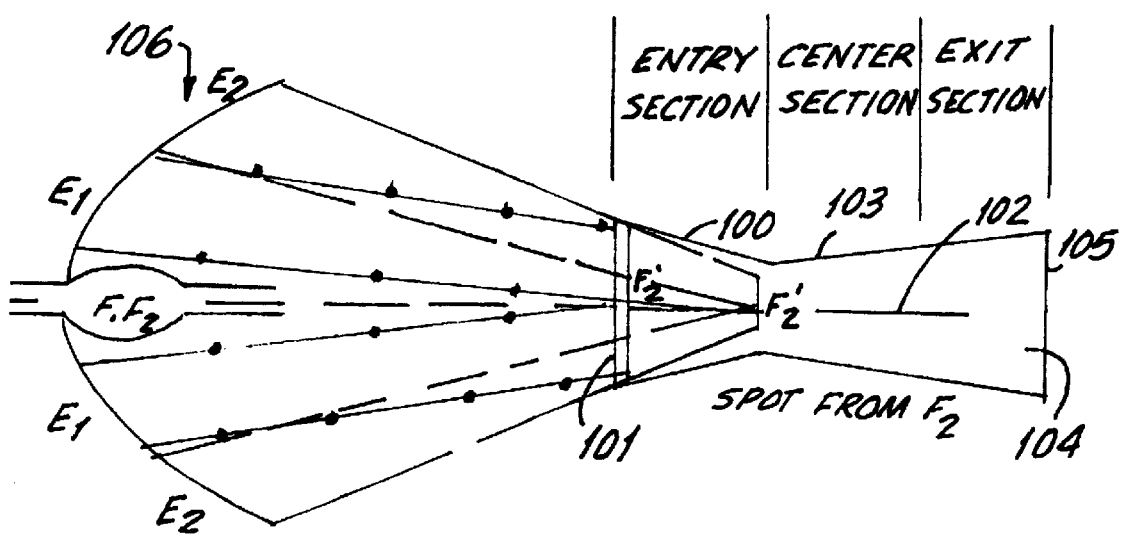

FIG. 26 is a side cross-sectional view of a double-tapered LPI.

DETAILED DESCRIPTION

As shown in FIG. 1, the first embodiment of the light engine of the present invention is used in an LCD (Liquid Crystal Display) projector system. That projector system includes an arc lamp 10 and reflector 11. The reflector 11 (collector assembly or collector optic) ) forms the light into a conical beam 12 (cone) having a peak (tip) 13. The beam is directed so that the cone peak 13 falls within the entrance pupil 14 (entrance face) of a light pipe 15—LPI (Light Pipe Integrator). The light exits from the exit pupil 16 (exit face) of the face 15 and is transmitted through the relay optics 17 consisting of first plano-convex lens 18 and second plano-concave lens 19. In some cases a field lens is used between the image gate and the projection lens. Those components form the light engine.

The relay optics 17 directs the beam onto the image gate (entry face) of an LCD panel 21. The LCD panel 21 is preceded in the optical path by a Fresnel lens 20 (Fresnel lens sheet) and is followed by a second Fresnel lens 22. A projection lens 23 focuses the image from LCD panel 21 onto a screen (not shown). A "Fresnel lens" is a plate having concentric grooves (about 40–300 grooves per inch) which is molded as a thin plastic sheet and replaces the curved surface of a conventional lens. It is available from Edmund Scientific, Barrington, N.J. 08007.

A light pipe is an elongated optical element having an entrance pupil, reflecting internal walls and an exit pupil. Light entering the entrance pupil is internally reflected to become homogenized (mixed). The light pipe (LPI—Light Pipe Integrator) of the present invention is preferably hollow with internal mirror walls. Alternatively, the light pipe may be a solid transparent member of optical glass or plastic whose outside walls should not be mirrored because it would lose its total internal reflective property. The solid light pipe is held in place by knife edge or plastic screw supports and covered (not touching) by a sheath, for example, a sheet metal sheath. The supports may be transparent screws mounted in the sheath whose points hold the light pipe in position.

The entrance pupil 13 is preferably cone-shaped or hemispherical (if solid LPI) or flat and round or octagonal (if hollow LPI) in a cross-section vertical to the optical axis to accord with the shape of the light beam cone. If the LPI is solid the beam cone is truncated perpendicular to its axis of rotation in the case of a flat entrance pupil. The light pipe exit pupil 16 is flat and rectangular and of the same aspect ratio as the aspect ratio of the image gate. That aspect ratio is typically 4:3 for LCD panels.

In all cases the light pipe section closest to the image gate is tapered so that the exit pupil is at least 50% larger (in area) than its center section and the light pipe becomes larger (in cross-sections perpendicular to its optical axis) towards its exit pupil, i.e., toward the image gate. This tapered shape permits an efficient transmittal of the light without wasting light, due to spillage, at the image gate. Preferably the ratio of the entrance pupil area to exit pupil area is in the range of 1:1.5 to 1:5 and most preferably in the range of 1:2 to 1:4. In all cases the cross-sectional area of the exit pupil is at least 50% greater than the cross-sectional area of the center section.

Figure 3:
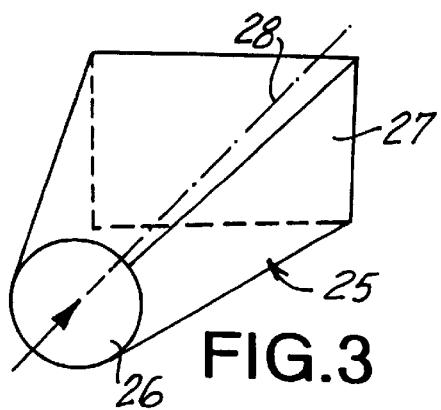
FIG. 3 is a perspective view of one embodiment of a light pipe of the present invention.
Figure 4:
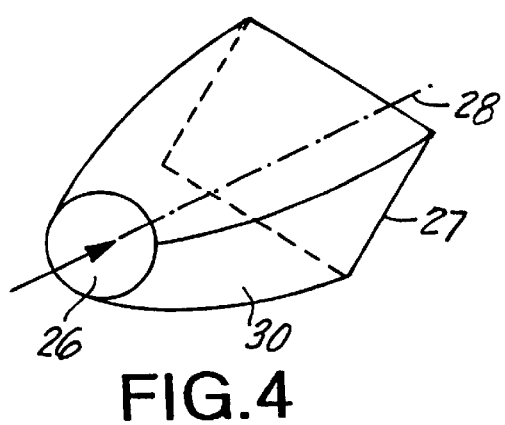
FIG. 4 is a perspective view of a second embodiment of a light pipe of the present invention.

In the embodiment of FIG. 3 the light pipe 25 has a round and flat entry pupil 26 and a rectangular and flat exit pupil 27, both of which are flat perpendicular to its optical axis 28 (dash-dot line). The aspect ratio (Width:Height) of exit pupil 27 is typically 4:3. The light pipe 25 at the entrance pupil 26 is round and its walls gradually become flat. The light pipe 30 of FIG. 4 is similar, except its walls are parabolic in shape, i.e., the walls are parabolic in cross-section profiles taken in planes through the optical axis 28.

One embodiment of a light pipe 31 is shown in FIG. 5 and a similar LPI is shown in FIG. 19. In that embodiment the entrance pupil profile 32 is curved and the exit pupil 33 profile is flat and rectangular in cross-section. In the embodiment of FIG. 19, for example, the diameter "q" is 14 mm and the height "p" is 24 mm and the exit pupil width is 18 mm. An entry portion 35 is round (in cross-sections perpendicular to the optical axis). The round entry section 35 extends for at least one-third, and preferably about one-half, of the length of the light pipe. The hemispherical profile entry pupil 32 receives a conical beam. In FIG. 19 the entry pupil profile 32a is cone-shaped.

The following dimensions for the solid glass light pipe of the type of FIG. 26 are presently contemplated for use with an LCD panel having an aspect ratio of 4:3; although the solid light pipe should be cooled to avoid heat build-up.

Length of light pipe: 106 mm

Entrance pupil, square and flat: 28 mm×28 mm

Exit pupil: Height (p) 24 mm Width: 18 mm Diagonal: 30 mm

Type of glass: solid optical glass Schott BK7

Length of round first section: 21 mm

Length of second section: 85 mm

There are a number of drawbacks in the use of solid glass LPIs:

(1) The entrance pupil and exit pupils would normally lose 4.5% at the glass air interfaces. To prevent that AR coatings would be needed.

(2) At the entrance surface of the LPI the converging light beam is reduced to a small spot generating intense heat, in the range of 300° C. This heat may distort and render ineffective any AR coating on that surface and may create substantial temperature gradients in the glass which may crack it. Low Expansion Borosilicate Glass (such as Pyrex) cannot be used for the fabrication of the solid LPI because it is not highly transmissive in the visible with losses in the range of 1% per ⅛". This loss would be unacceptable in a LPI of approximately 4" in length.

(3) Because of the heat related drawbacks for a solid glass LPI, a hot mirror filter would be required to filter out the IR (heat radiation) from the incident beam. Such filters typically reduce visible radiation by about 12%, and therefore will remove any advantage one may get by the TIR (Total Internal Reflection) process.

(4) Solid glass LPIs may be more expensive to manufacture than hollow LPIs.

(5) A solid glass LPI may have defects, such as bubbles and striations, typical of glass manufacturing. Such defects tend to scatter light, thus affecting the color of the projected beam. The heating of the entry pupil AR coating would generate some unwanted optical effects as well.

(6) The mechanical integration of a solid glass LPI presents a certain degree of difficulty because the outer surface needs to remain clean and untouched in order to preserve the TIR effect.

Hollow LPIs are preferred to solid LPIs for a number of reasons. Costs are reduced because the hollow LPI may use flat, reflective coated material that is mechanically easy to assemble and integrate into the "light engine" system. There are no problems with entrance and exit pupil losses (no AR coatings needed), or heating of the glass substrate. Low expansion borosilicate glass can be used as a reflector substrate (the base for the internal reflective walls). The light travels through empty air space, thus no scattering or other interference occurs.

The internal reflective coating can be a cold mirror coating, thus making a major contribution to the removal of heat from the light beam. The removal of IR heat radiation from the beam of light, without the addition of transmissive heat filters that reduce substantially the visible light in the beam, is a major advantage.

An LPI has been fabricated and tested using a cold mirror coating (HR98A) manufactured by Optical Coating Laboratories Inc. (OCLI) of Santa Rosa, Calif. It has a reflectivity of 98.5% average over the visible spectrum (compared to the expected TIR of 99.5%). Such coatings are typically used in flat mirrors and are designed for a specific angle of incidence (such as normal or 45 degrees). One gets a color shift in the reflected light if the incident light is more than +/−15 degrees off from the design angle for the coating. The application of this cold mirror coating (a multilayer or dielectric coating) in an LPI makes the angle of incidence dependence of the coating not critical. One of the major properties of the LPI is the "homogenizing" of the colors within the LPI, so by the time the beam exits from the LPI the various colors are well mixed and color uniformity is excellent.

A preferred LPI configuration is a hollow LPI using highly reflective mirror coatings on its internal walls deposited on low expansion glass. Such a coating is the OCLI HR97C, an enhanced aluminum mirror coating with 97% reflectivity. A preferred coating would be a cold mirror coating that allows the heat rays (IR) to be transmitted, while reflecting the visible rays. Such a coating is the OCLI HR98A coating made of layers of thin film dielectric material with a reflectivity in the visible part of the spectrum an average of 98.5%.

A preferred hollow LPI shape has an octagonal and flat (cross-section) entrance pupil, with a tapered first section ending in a square (cross-section). That square is attached to a second section (center section) with a square cross section (14 mm×14 mm) and a larger exit pupil cross section (exit section) to match the shape of the image gate addressed, as shown in FIG. 26. The overall length is 106 mm and the entrance pupil is 28 mm in diameter and the exit pupil is 18 mm high and 24 mm wide.

Figure 6:
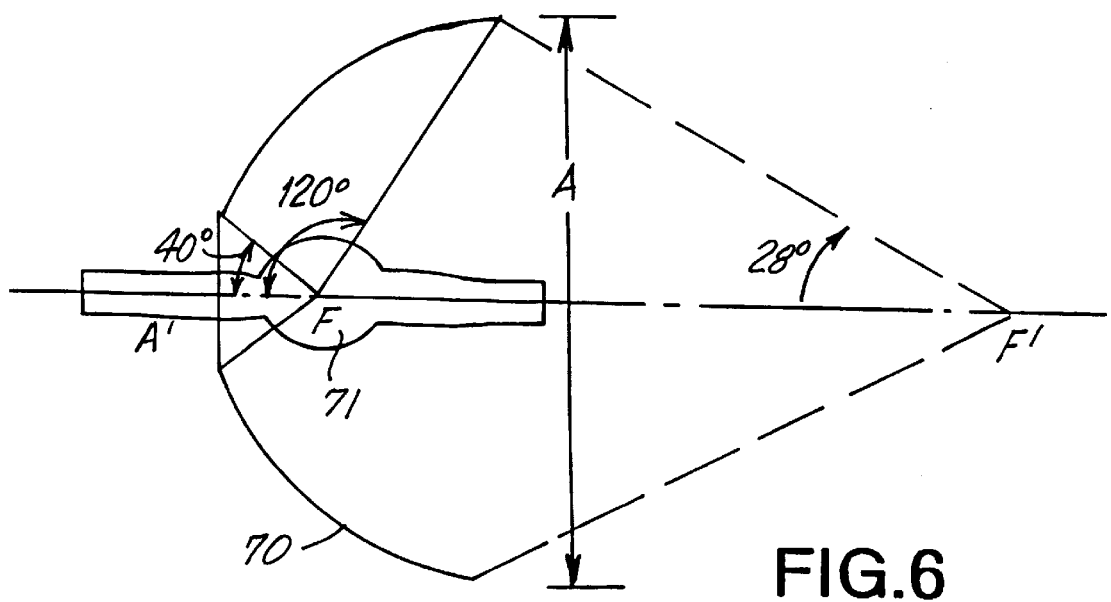
FIG. 6 is a side cross-sectional view of a lamp and reflector.

A preferred arc lamp bulb and its reflector is shown in FIG. 6. The reflector 70 (collector optic) is metal with a mirror interior finish and is elliptical in shape (17.27 mm F (center), e=0.746. The lamp bulb 71 is a plasma arc bulb, for example, type HTI 404W/SE by OSRAM. The light source may be a xenon arc lamp or an incandescent source such as a halogen lamp. The reflector diameter "A" is 3.250 inches (82.55 cm).

Figure 7:
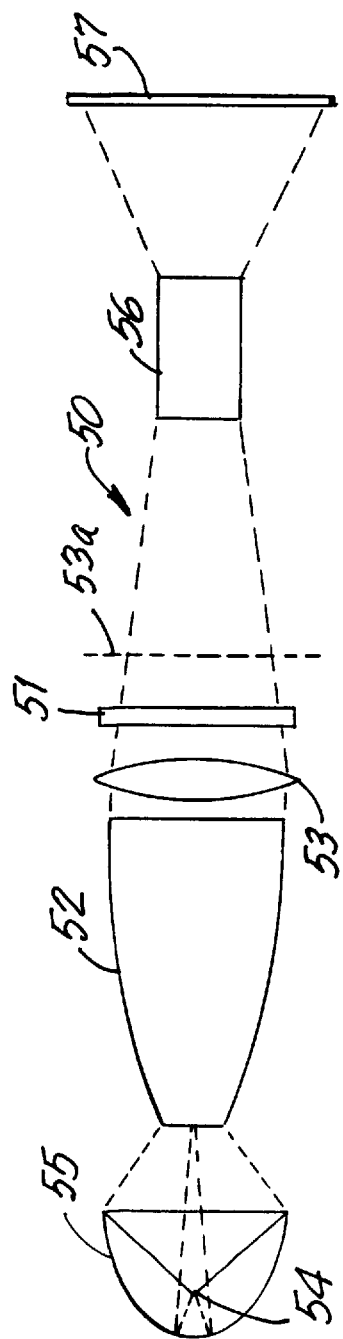
FIG. 7 is a side view of another embodiment of a projector system of the present invention.
Figure 8:
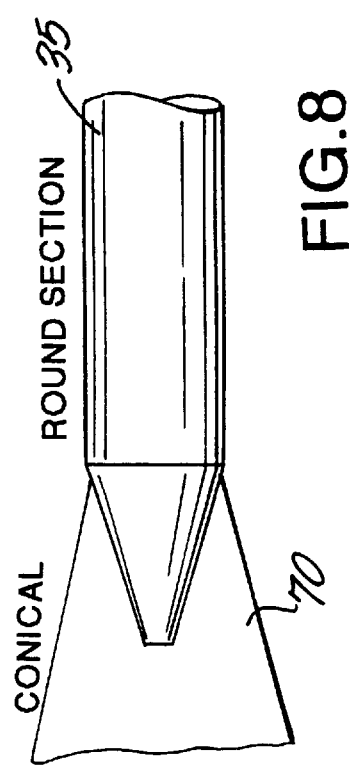
FIG. 8 is an enlarged side view of the entrance portion of a preferred embodiment of the light pipe.

The embodiment of FIG. 7 shows a configuration of the light engine 50, but the relay lens component is eliminated. The LCD panel 51 is placed at the exit pupil of the light pipe 52 with a field lens 53 between the light pipe and the panel. A field lens could also be positioned in position 53a, following the image gate, or two field lenses could be used one in position 53 and one in position 53a. The design of the projection lens 56 will have to match the choice of the field optics. In this configuration, the light pipe exit pupil is of the same general size as the image gate, i.e., a film gate or an LCD panel. The plasma arc lamp 54 and reflector/collector 55 may be of the type of FIG. 6. The system also includes a conventional projector lens 56 and screen 57. This configuration is effective for smaller image apertures, under three inches in diagonal. The elimination of the relay optics results in tighter packaging (shorter length) for the projector. There is a substantial reduction in the length of the light path.

Although the description set forth above is in connection with an LCD panel, the invention is also applicable to film projection systems. The following light engine may be used in a film projection system: a light engine comprised of (a) a plasma arc lamp (or halogen lamp), (b) a collector optic, (c) a light pipe integrator, (d) relay optics, (e) field optics, (f) a slide projector film gate or a motion picture projection film gate or an overhead projector stage, and (g) a projection lens.

The relay optics 17, shown in FIG. 1, images the exit pupil 16 of the light pipe onto the image plane of the image gate, i.e., the LCD light valve. The choice of the relay optics is such that the proper magnification is achieved at the desired distance. The chosen distance is such that the appropriate beam divergence is achieved at the image gate.

The field optics are designed to direct the light beam through the image gate and into the entrance pupil of the projection lens at the proper cone angle and size. In FIG. 1 two Fresnel lenses are used. The first Fresnel lens 20 collimates the light entering the image gate and the second 21 condenses the light leaving the image gate. For large aperture panels where glass lenses are not practical, Fresnel lenses are used. For smaller apertures glass lenses can be used to achieve the same goals with lower transmissive loss of light.

In the example of FIG. 1 the light modulator panel 21 is a transmissive LCD panel. It is the center piece of the design, since it has certain properties that are fixed and have to be accommodated by the design of the light engine. The light must be distributed evenly over the aperture. The angle of incidence of the light beam on the LCD panel 21 is critical because the image contrast and contrast uniformity are very sensitive to that angle. In most cases the required beam angle is in the range of 5 to 6 degrees, setting the system speed at an f/4.0 to an f/5.0. In practice, angles of up to 10 degrees yield acceptable image quality. All other optical elements must be designed to accommodate these requirements. The angle at which the light valve is positioned relative to the projected image is also critical for contrast and contrast uniformity.

The projection lens 23 is designed to meet certain system requirements. The acceptance cone angle, field angle, f# (f stop number) and focal length must be chosen to accommodate system restrictions and requirements. Part of these requirements that affect the chosen focal length relate to desired throw distance/image size ratio that also depend on the size of the image generated by the LCD panel. The projection lens must have sufficient resolution to resolve the LCD pixels and otherwise preserve image fidelity. The projection lens 23 should be free of distortions and may have to be of a telecentric design.

An important feature of the present invention is the shape of the reflector (concave mirror) which gathers the light from the lamp and directs it at the entry pupil of the light pipe. The shape is curved with two elliptical sections. It is a concave reflector whose back end (closed end) is formed as an ellipse having a first eccentricity and focal point $F_1$ and whose front end (open end) is an ellipse having a second (and different) eccentricity and focal point $F_2$. This variable ellipse reflector does not form a sharp image (point or line focus) at a focal point, since it is not used to form an image. Instead, it forms a fuzzy ball of light located at, or within, the entrance pupil of the tapered light pipe. The internal mirrored reflecting surface is a nonspherical continuously curved surface having two, or more, difference generators of curvature (preferably ellipses) and in which the cross-sections are circular (perpendicular to the optical axis of the cone of light).

Figure 9:
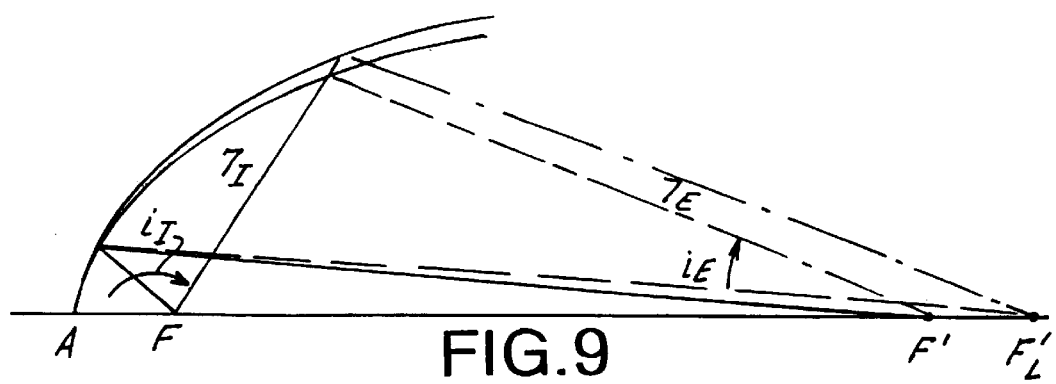
FIG. 9 is a polar coordinate system showing two collector optic (reflector) for elliptical conic sections having the same focus F but different eccentricities (solid and dash-dash line). The second focal points are F' and $F_1'$.

Two of the critical elements of the light engine are the LPI (Light Pipe Integrator) and the collector (reflector)-"collector optic". Matching these two optical elements for optimum performance is extremely important. A typical (prior art) collector optic is an elliptical conic section that collects the light from the lamp and directs it to the entrance of the light pipe. FIG. 9 shows such a collector and defines the various angles of importance. The angle i(I) is the collection angle (the angle over which light is collected and directed with the lamp at F, the primary focus, taken as the center); the angle i(E) is the convergence angle (the angle of reflection relative to the optical axis of a light beam on the reflector); F' and $F'_1$ are the secondary foci of the two elliptical sections of the collection optic, using the same primary focus F but of different eccentricities.

A parametric study has been made of the elliptical collector and a number of insights established related to its functioning in conjunction with the LPI. For an efficient collection of light from an arc light source it is required that the collection angle i(I) sweep through between 35 and 135 degrees. This angle sweep may not be mechanically or otherwise attainable for each application, so the analysis considers a more modest collection angle sweep between 40 and 120 degrees although, when conditions allow, a collection angle between 35 and 135 degrees should be implemented. Eccentricities of the ellipse between e=0.60 and e=0.90 are investigated. Most practical applications would fall in the range of e=0.60 to e=0.80. This does not mean that special circumstances may not indicate the use of eccentricities outside this range.

Figure 10:
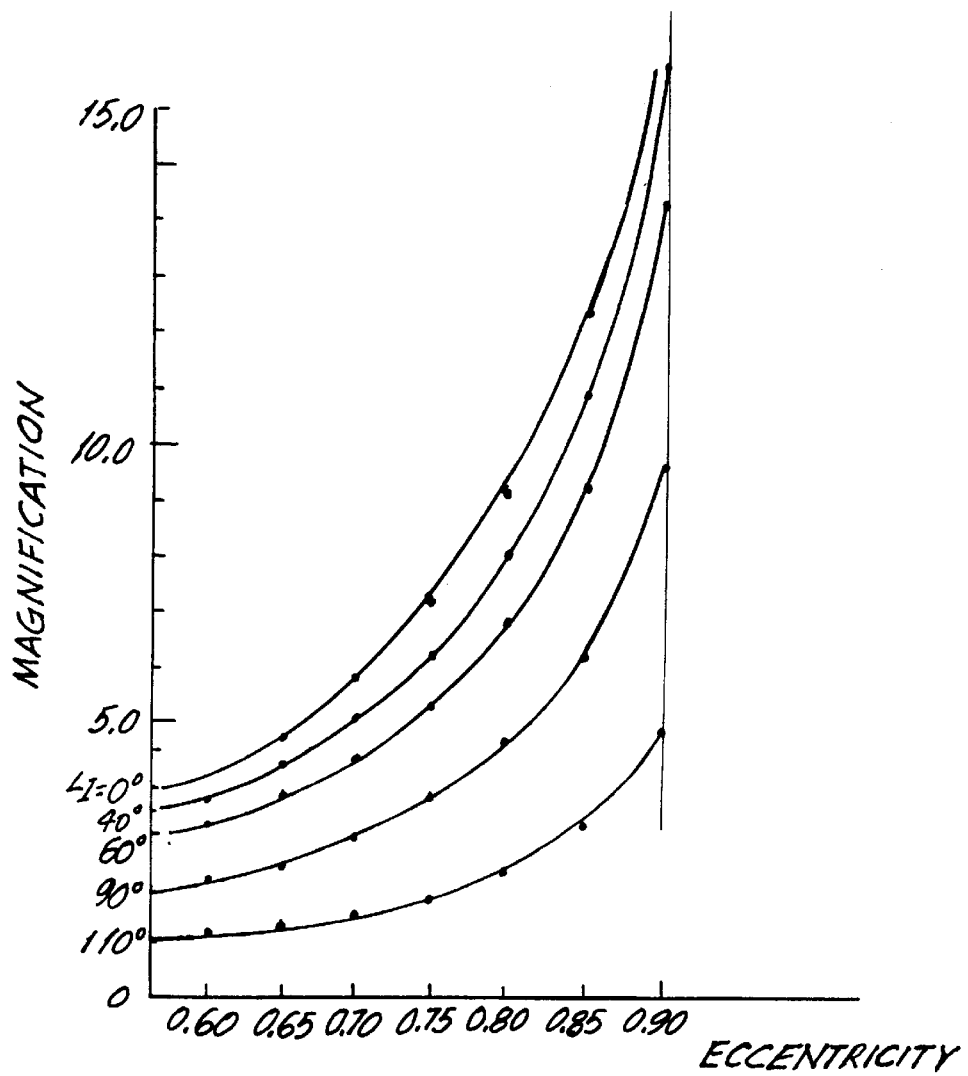
FIG. 10 is a chart plotting eccentricity (e) of elliptical curves of a reflector (x axis) against magnification (y axis) for five various collection angles ($i_f$) from 0° to 120°.
Figure 11:
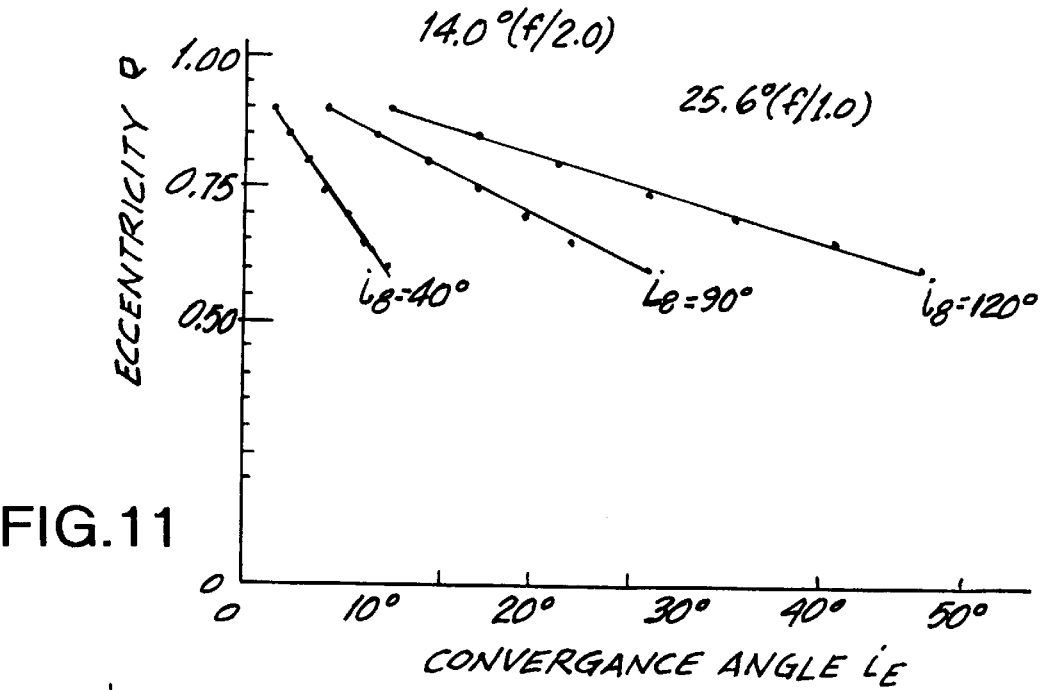
FIG. 11 is a chart plotting eccentricity (e) (y axis) from 0 to 1.00, against convergence angle ($i_E$) (x axis) from 0° to 50° for three collection angles ($i_f$ at 40°, 90° and 120°), for a half-cone.
Figure 12:
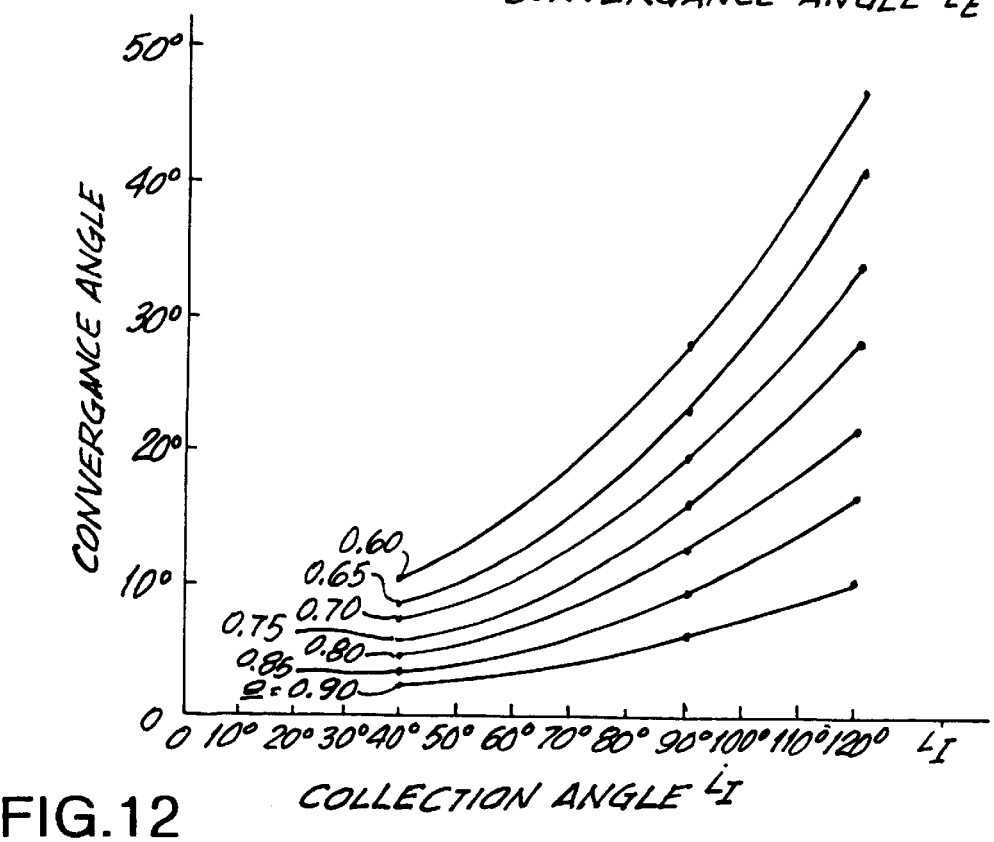
FIG. 12 is a chart plotting convergence angle ($i_E$) (y axis) against collection angle ($i_f$) at seven eccentricities of elliptical curves from e=0.60 to 0.90.

With the collection angle limited to 120 degrees, parametric plots are made for the magnification vs. eccentricity at various collection angles (FIG. 10) and the converging angle vs. eccentricity at various collection angles (FIG. 11). A plot of convergence angle vs. collection angle at various eccentricities is shown in FIG. 12. The following conclusions are drawn:

1. The collector maximum convergence angle at the collection angle of interest (120 degrees) is solely dependent on the eccentricity of the ellipse. This is the maximum convergence angle that a LPI will see.

2. The magnification of the focal spot depends also primarily on the eccentricity of the ellipse, at various collection angles.

Figure 13:
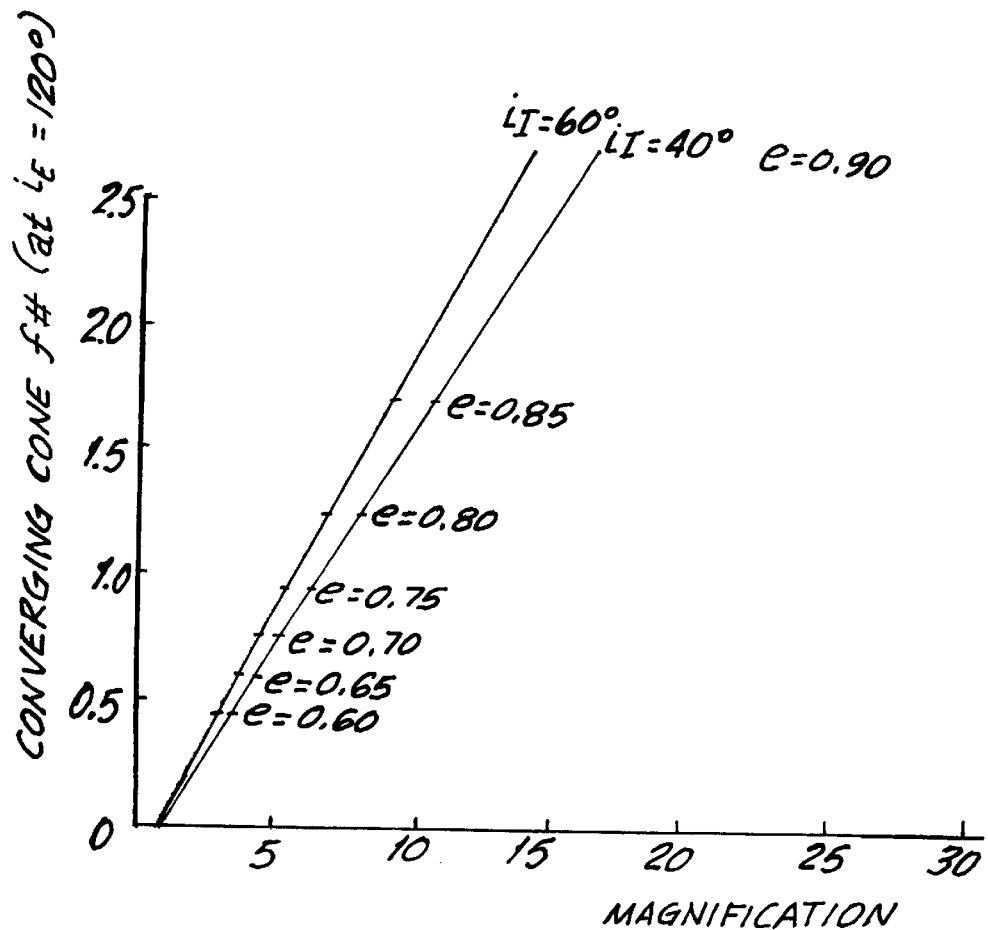
FIG. 13 is a chart plotting converging cone f# (at $i_E$=120°) (y axis) against magnification (x axis) at two collection angles ($i_f$=60° and $i_f$=40°)

3. Since the convergence angle gets bigger as the focal length of an ellipse becomes smaller, an optimization decision is made when matching a collector optic with a LPI. A small spot at a small convergence angle is desired. FIG. 13 shows a plot of the converging cone f# (focal number) as a function of the magnification.

4. It should be noted that the light coming out from the back end (closed end) of the elliptical reflector has the smallest convergence angle and the highest magnification. The light coming out from the front end (open edge) of the reflector has the highest convergence angle and the smallest magnification.

5. The light coming out of the arc lamp is fairly evenly distributed within the collection angle sweep between 35 and 135 degrees.

Figure 14:
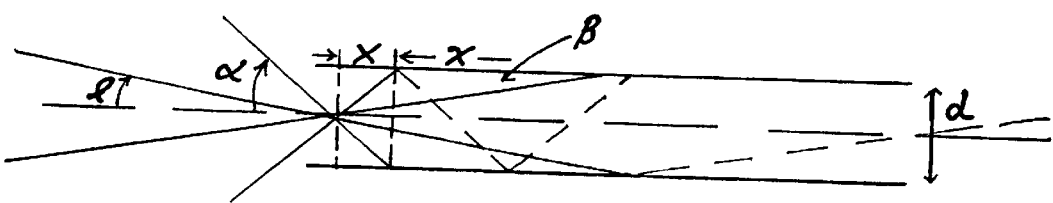
FIG. 14 is a cross-sectional view of a light pipe (cross-sections circular perpendicular to optical axis and the same size). It shows a simplified diagram of a light cone entering the entrance pupil of the light pipe integrator (hollow, mirrored interior walls)
Figure 15:
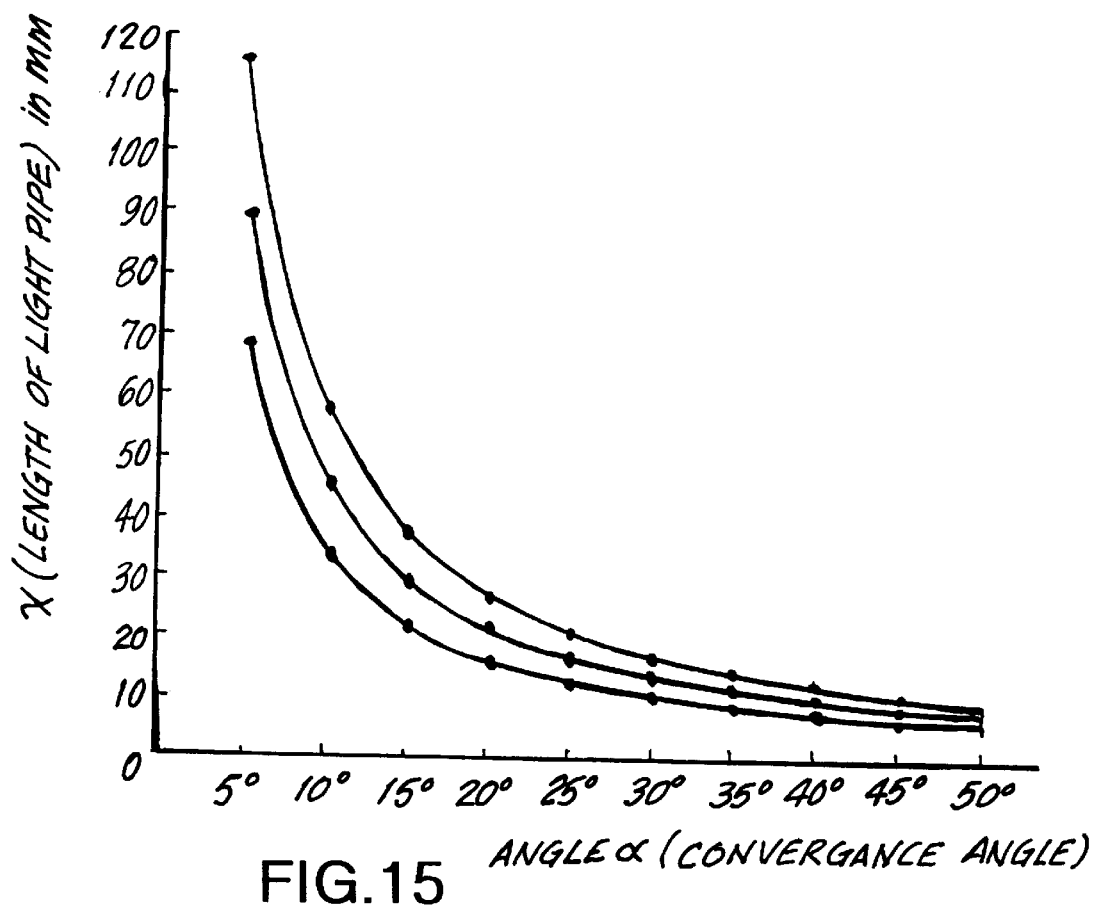
FIG. 15 is a chart plotting the length of the light pipe required for the first reflection in mm (y axis) against the angle of convergence (alpha) (x axis) from 0° to 50° for the three diameters (d) of FIG. 14B.

A constant cross-section hollow LPI is shown in FIG. 14A only for the purpose of explanation. A beam of light includes angles of incidence of a (alpha) and b (beta) represents the input from an elliptical collector optic. The smaller angles b will obtain their first reflection, within the light pipe wall, further down than the larger angles a. The larger angles a will have more reflections as they travel down the LPI. The LPI should be circular, rectangular or square in cross-section. The distance down the LPI for the first reflection of an incident ray at various angles of convergence a (alpha) for a number of sizes LPI openings d are depicted parametrically in the plot shown in FIG. 15. Subsequent reflections after the first reflection will occur down the LPI every 2x (twice the distance from entry pupil to the first reflection). In FIG. 14B θ (theta) is the angle of convergence. The angle α (alpha) represents a small angle of convergence and the angle β (beta) is the largest angle of convergence from the reflector. x is the initial principal ray's first reflection distance in the LPI; 2x is the distance for its second reflection; and tan a=d/2/x and x=d/2 tan θ.

Figure 16:
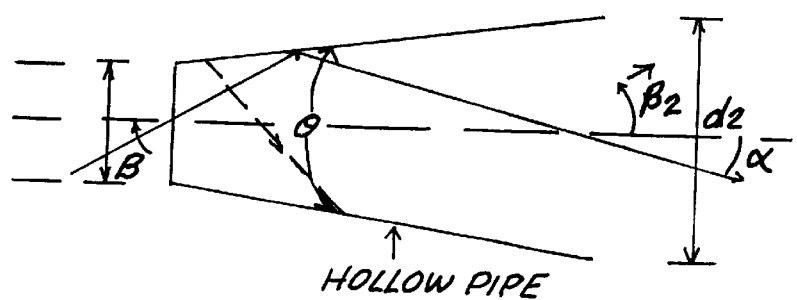
FIG. 16 is a simplified cross-sectional diagram of the tapered light pipe of the present invention (hollow) having circular cross-sections.
Figure 17:
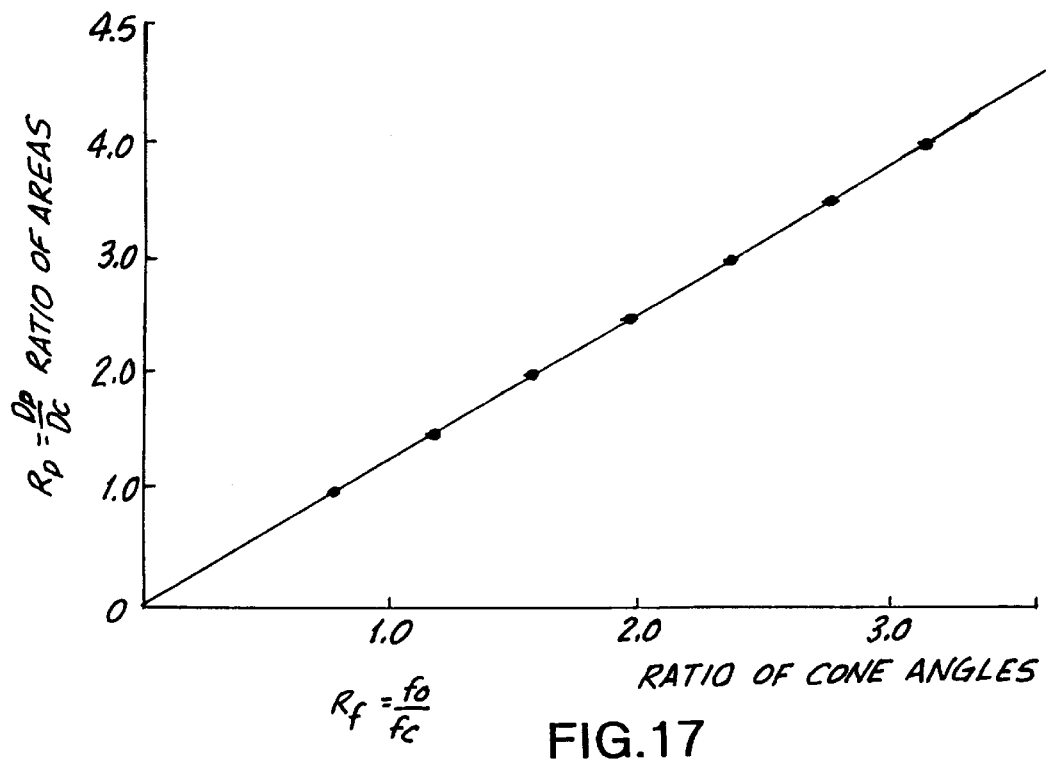
FIG. 17 is a chart plotting the ratio of the areas of the entry pupil:exit pupil $$\left( R_D = \frac{D_p}{D_c} \right)$$

A tapered LPI is shown in FIG. 16 with the wider portion toward the film gate. Principal rays coming in at the entry pupil (smaller end) exit at the exit pupil (larger end) at a smaller angle. The angle of the incident ray (e.g. α or β) is changed each time it is reflected from the wall of the LPI by θ (theta). A tapered light pipe is used to change the f# of the incident beam to a larger f#, thus reducing the angle population maximum value at the exit of the light pipe. This is an important advantage of the tapered LPI. FIG. 17 is a plot relating the ratio of the diagonals of a circular entry pupil and rectangular exit pupil of a tapered light pipe to the ratio of the f#s at its entry and exit pupils. FIG. 18 is a parametric plot of the light pipe diagonal vs. the exit pupil cone angle for an entry pupil diagonal of 16 mm, based on a circular entry pupil and a rectangular exit pupil.

The following conclusions follow from this study:

1. The incoming light cone from the elliptical collector optic spans a range of convergence angles, from about 6 to 45 degrees, and has a variety of spot sizes. The LPI optic recognizes and deals with this variation through an optimization decision process. Preferably the LPI optic uses double-taper sections. The larger entry pupil, due to the entry section taper, enables the LPI to gather the larger spots (at the lower angles) while not adversely affecting the smaller spots (at the higher angles. The double taper, shown in FIG. 26, is called "V-BLOCK" or "V-8" (TM, Torch Technologies).

2. One of the functions of the LPI is to integrate the incoming light beam in terms of color and light distribution at the exit pupil of the light pipe. This is the mixing function. In order to do this function, a number of reflections must occur inside the light pipe, both for the smallest and largest incident angles.

3. The LPI also performs a beam shaping function. The output LPI cross-section (exit pupil) should be the same shape and aspect ratio as the aperture (image gate) to be illuminated. The entry pupil of the LPI is best fitted to a round cross-section incoming beam, i.e., a conical beam.

4. The LPI can function as an optical element that will change the f# of the cone angle of the angle population between the incoming beam and of the outgoing beam. The "angle population" is the average amount of light at each angle to the optical axis, i.e., if the light is 80% at angles less than 6 degrees it has a low angle population. This function, of changing the angle population, is performed by the tapered geometry of the LPI. This is very important because the LCD panel angle population acceptance angle is rather limited (under 10 degrees). The tapered shape of the LPI reduces the maximum angle of the incoming angle population and produces an outgoing light beam having a low angle population (at least 80% is under 10 degrees).

The desired goals of the LPI based light engine are to provide the maximum possible amount of light that can be collected from the arc lamp through the image gate (open aperture where the LCD panel is located) at the proper angle population. The angle population should be limited to ±15 degrees, and is preferably within ±10 degrees, and is most preferably ±6 degrees.

A number of conflicting requirements must be evaluated, and decisions made, for optimization purposes. The choices involving the collector optical element, an ellipse, are between a small spot and a small convergence angle, which are incompatible. An ellipse in the eccentricity range between e=0.65 and e=7.5 is chosen in conjunction with a light source 3 mm long (the arc gap is 3 mm). This range of eccentricities provides small spots and relatively large convergence cone angles. The higher eccentricity end (e=7.5) is dictated by the magnification that can be tolerated (arc gap 3 mm). For example, at a collection angle i(I) of 40 degrees the magnification at e=0.75 is approximately X6. A 3 mm arc gap will be imaged into a 18 mm spot. At e=0.60, it will be imaged into an 11 mm spot. The maximum angle of convergence for e=0.75 is 28 degrees and for an e=0.65 it is 41 degrees. The maximum of the converging angle is dictated by the number of reflections in the light pipe one can tolerate (the sharper the angle the more the number of reflections), and the limit imposed by the critical angle of the medium of the light pipe medium. There are a number of reasons for selecting this range of eccentricities 0.65–7.5 as an optimum range. The higher angles can be tolerated in a LPI made of solid glass where the principal of total internal reflection (TIR) applies. At TIR, the effective reflectance value is better than 99.5%. For this reason one can afford to have large converging incoming angles, which reflect many times inside the LPI, since losses remain low. The tapered LPI can reduce such angles at the LPI exit pupil. In addition, the minimum angles of the incoming cone are also somewhat bigger, thus reducing the distance between reflections inside the LPI and reducing the LPI length necessary to obtain good mixing. The allowance of larger entrance cone angles also makes it possible to collect more light in the collector optic. The smaller incoming spot makes the entrance pupil of the LPI smaller and helps the ratio of the entrance and exit pupil (aperture) diameters become bigger. This determines the reduction in exit cone angle population that can be achieved. This process can be used to define an optimum eccentricity range for other arc light sources that may have smaller or larger arc gaps.

One of the problems with the tapered LPI, and other LPIs, is that some of the small angles coming into the LPI will not reflect even once and go through unmixed. This adversely affects the color uniformity and the light distribution on the screen. For this reason, and to optimize the LPI performance, one LPI configuration is described that optimizes the LPI functions listed above, shown schematically in FIG. 5. It is a hollow LPI. The center section is narrow and has a constant cross-section (round in shape). The first section is the mixing section for the incoming cone. The entrance pupil of the LPI has a cone, or quasi spherical, open entrance. This approach avoids any refractive effects that would tend to reduce the angles to the normal upon entry which would make distances between reflections further apart and therefore require a longer LPI. At the interface between the circular and rectangular light pipe section (the exit section) a number of transition shapes are possible. A preferred shape, easy to fabricate, would require the end of the circular light pipe of the mixing section to become a rectangle of the proper aspect ratio with the same diameter as the light pipe. This, then, would be mated to the small end of the tapered section of the light pipe whose purpose is to reduce the maximum cone of the exit angle population. The light pipe mixing section should be long enough and with a cross-section small enough where the lowest converging angle of the entrance beam can get at least one reflection inside. Another preferred transition shape for the mixing section of the LPI or, for that matter, for an LPI consisting solely of a tapered section, starts with an octagonal LPI entrance cross-section instead of circular. The octagonal cross-section can make a smooth transition with a rectangular LPI exit cross-section, as shown in FIG. 20. This transition geometry is most suitable in developing good corner coverage for the light distribution on the screen.

The fundamental trade-offs involved in the LPI/Collector optic combination are depicted in FIGS. 13 and 17. FIG. 13 details the relationship between the convergence angle (listed in terms of the f#), the magnification and the eccentricity e of the elliptical collector optic. At low eccentricities one obtains low magnification and large convergence angles. At high eccentricities one obtains high magnification and smaller convergence angles. The plot depicts the maximum convergence angle (originating at the edge of the ellipse) and the maximum magnification (originating at the smallest collection angle of 40 degrees). FIG. 17 shows how the ratio of the diagonals for the entrance circular aperture of the LPI and the exit diagonal relate to the change in f#s of the incoming and outgoing one angle populations. Since the LPI exit area is limited to the size of the panel diagonal for small LCD panels (or other open apertures) up to about 3", the smaller the entry diagonal is the better the cone angle populations will be when incident on the panel (i.e., smaller cone angles).

Table 1 (FIG. 25) describes the first order approach to optimization. Three typical LCD panels have been selected, 1.3", 2.0"and 3.0" (4:3 aspect ratio). The arc gap size is then chosen. A popular metal halide lamp currently in production is the Osram VIP R 270 which has the smallest arc gap (1.6 mm) available in that power range. It puts out 15000 lumens. Another lamp used in this optimization is an Osram MH lamp 404W/DE with 30000 lumens at 400 watts and an arc gap of 3.0 mm.

With the small gap lamp an eccentricity of 0.75 is chosen as a first iteration. The results listed in Table 1 show that the spot size at the entrance of the LPI has a diagonal of 10 mm. The end result indicates that this choice of arc lamp is a good match for the 2.0" panel; an easy fit with the 3.0" panel and somewhat of a mismatch for the 1.3" panel. The cone angle population has a maximum of 28 degrees from the ellipse while the acceptable cone to yield an f# of 3.5 at the panel is 20.3 degrees. For the 3.0 mm gap lamp a smaller eccentricity is used to reduce the magnification of the entrance spot into the LPI. The 3.0" panel is a good fit with this eccentricity and arc gap. The other two panels would reject a substantial amount of the light that resides in the higher cone angles.

For the situations where there is not a good fit in the cone angle population, a good trade-off would be to lose some incoming light by making the entrance diagonal to the LPI smaller, i.e., allow only a 10 mm entry pupil (aperture) for the 3.0 mm arc lamp. That approach would reject some of the initial spot. However, about 75% of all the light is concentrated within 50% of the diagonal, so cutting the outer edge is not as bad as cutting off some of the converging cone angles. Within the converging cone, roughly 10% of the total light is within each 10 degree collection zone. A good balance can be reached after an iteration or two. However, preferably a hollow "V-BLOCK" (V-8 INTEGRATOR—TM of Torch Technologies LLC) LPI is used having an entrance tapered section and an exit tapered section, see FIG. 26. That device can accommodate both the generated spot size and its cone angle population. The entry tapered section (the entry pupil) collects all the light from the incoming beam. The embodiment of FIG. 26 preferably is used in the "VAREX" (TM) reflector having a variable elliptical eccentricity and two, or more, focal points.

Once one has chosen a lamp and an image gate, such as a LCD panel, that determines the size of the arc gap and the size of the panel. These two parameters essentially set the limits of the accommodation one can make between spot size and convergence angle population for the elliptical collector and the LPI. The choice of the eccentricity of the elliptical collector element sets the values for the maximum cone angle of the convergent spot and the maximum magnification of the 40 degree collection angle at the back of the collector. A parameter of importance to metal halide arc lamps in particular is the power at the lamp vs. the gap size required. The VIP R 270 (270 watts), for example, with a gap of 1.6 mm, generates only 15000 lumens. The HTI 250 (270 watts) with a gap of 2.4 mm, generates 20000 lumens. The HTI 404 (400 watts), with a gap of 3.0 mm, generates 30000 lumens. The HTI 600 (600 watts), with a gap of 5.5 mm, generates 45000 lumens. The arc gap is in the range of 1 to 6 mm. This means that a VIP R 270 may direct more light through a 1.3" panel than the HTI 600 (600 watts) in spite of the fact that it generates only one third of the lumens of the HTI 600, due to the geometric factors involved.

One of the limits imposed on the optimization between light source and image aperture is due to the elliptical collector that is defined in terms of a single eccentricity. This is a severe limitation because once one selects the eccentricity, it determines a specific value of the maximum convergent cone angle and the maximum magnification for the spot. The present invention provides a design of elliptical collectors with variable eccentricity. It is desirable to keep the eccentricity of the back rays collected around the 40 degree collection angle at a small eccentricity to reduce magnification. It is also desirable to keep the edge of the ellipse at a collection angle of 120 or more degrees at low eccentricity to reduce the converging cone angle population. This indeed can be done. An elliptical curve can be designed where the back end starts at a lower eccentricity than the front end. FIG. 21 shows a curve with a variable eccentricity derived from equal magnification requirement for all collection angles. One can see that the result is that the various zones focus at different points along the optical axis. The interfocal distance for each eccentricity is different. Clearly, such a major change in eccentricity along the various collection angles is not practical. This example is an extreme one for the purposes of demonstrating the effect of variable eccentricity elliptical collectors. FIG. 22 shows a practical example of a variable eccentricity curve. In this case the spread of eccentricities is limited to 0.05. The different elliptical curves have different focal lengths, within ±2 mm of a central focal point. Even though the two beams focus at different points on the optical axis, the LPI can still collect all the light projected by the collector. The light collected by the elliptical collector need not be focused in a single focal point.

In the example of Table 1, the 3.0 mm gap parameters, it is preferable to use (at the bottom line) 28 degrees instead of 34, if the eccentricity for the high collection angles is 0.75 instead of 0.70. This provides a much better match for the 3.0" panel and a closer match for the smaller panels. In Table 1, the 1.6 mm gap arc lamp, it is preferable to use 0.80 eccentricity instead of the 0.75 defining the bottom line. In such a case the angles would change from 28 to 21 degrees, thus being a much closer match for the small 1.3" panel. The above optimization applies to light pipe designs where the panel has approximately the same diagonal as the exit pupil of the LPI. In situations where the panel is much larger, say 6.4" in diagonal, it is not essential to have such a collector design. However, the same optimizations, though, apply and the net effect is that one could collect as much as 25% more light using the variable eccentricity optimization. In the variable eccentricity designs an LPI may have a flared entrance to accommodate extra collection capability from the incoming cone of light (FIG. 22). For small panels one does not need relay optics and the optical engine configuration can be as in FIG. 7. For panels larger than about 3.0" in diagonal, the light engine design will follow the design of FIGS. 1 and 2.

The optimization process consists of adjusting each component to obtain the best possible system. There are a number of constraints, usually imposed by market requirements, related to the performance/form factor of a given projection system. Such considerations include size and weight, expected screen lumen output, resolution and image quality. Once such desirable features have been defined, the designer selects the appropriate optical components that will render a light engine as effective as possible within these constraints. The optimization process integrates all the elements of the light engine to obtain the best possible performance system. The optimization process can be pursued as follows. The LV (Light Valve) panel is selected and its aperture (image gate) matched with a plasma arc light source. In general, most optical elements can be matched using a figure of merit called the geometric extend (GE). The GE concept is based on the Lagrange Invariant principle, which states that for a given light source (or other optical element) one has to trade angle of incidence with magnification of an image. Since one cannot generally obtain both in the desired magnitude, a trade-off must be achieved to optimize a particular optical design.

The following steps can be taken to optimize a light engine.

(1) The light source must be matched to the image gate (LCD) selected in terms of GE, for optimum use of the light generated by the arc lamp. The light utilization factor will be the ratio of the GE (LCD) to that of the lamp. This becomes a problem for smaller apertures as smaller arc lamp emitting elements are required. The GE of a lamp and an LCD panel can be calculated as shown in the following reference: "Analysis of the optical components in liquid crystal projectors by their geometrical extend" by C. Nocolas, B. Loiseau, J., P. Huignard, *Eurodisplay Conference* 1993, pages 537–539.

(2) The collector must be designed to collect the maximum amount of the light emitted by the arc lamp. The larger the angle that is collected, the larger the aperture of the collector and the larger the light beam cone angle. The limitation on cone angle utilization is introduced by the panel characteristics, which nominally require that the angle of incidence on the panel be a maximum of around 6 to 10 degrees half-cone. Light incident at larger angles must be rejected since it degrades image contrast. The collector must be designed to collect the maximum amount of light from the lamp consistent with system requirements regarding the angle of incidence of the light on the panel. The magnification realized by the collector in projecting the spot (the small end of the cone of the light beam) must be taken into account, since the spot size should be small in order to be efficiently collected by the light pipe integrator. The smaller the arc size the easier it is to collect the light and get smaller spots at the entrance to the light pipe.

(3) The light pipe integrator entrance pupil must be big enough to accommodate a major part of the spot generated by the collector. There are a number of factors that need to be balanced in the light pipe design. The light pipe cross section needs to be small enough, and the light pipe long enough, so that a sufficient number of reflections take place inside the light pipe to appropriately homogenize the light beam and develop a desirable distribution of light at its pupil. Starting with a low cone angle helps. The light pipe is shaped and tapered to help reduce the GE factor of the beam. At the exit pupil of the light pipe the light and color distribution achieve the desired values. The beam at the exit pupil is rectangular with a aspect ratio to match the image gate (image aperture).

(4) The relay lens images the exit plane (exit pupil) of the light pipe onto the image gate, i.e., panel aperture and the field lens optics. Part of the design optimization process involves a decision related to a trade-off between length of optical path, beam cone angle and magnification. The task is to achieve the shortest possible optical path consistent with the cone angle limitations and the required magnification of the exit pupil of the light pipe to match the image gate. The smaller the image gate the less there is to trade between cone angle and magnification.

(5) The field lens optics shown in FIGS. 1 and 2 are split. The optics consist of two Fresnel lenses. The first one has a focal length to match the incoming beam divergence. It collimates the incident light passing through the aperture to the extent possible, thus minimizing the angle of incidence on the LCD panel. The second Fresnel lens condenses the beam to pass it through the entrance pupil of the projection lens. For small apertures the Fresnel lenses can be replaced by glass lenses.

FIG. 26 shows the most preferred embodiment of the invention. The entry section 100 starts with the entry pupil 101. The entry pupil is flat (cross-section vertical to optical axis 102) and may be round or octagonal. This LPI is hollow and constructed from flat glass mirrors. The entry section is tapered in shape with the larger portion toward the light source (left in FIG. 26). In the prototype the entry pupil cross-section is square, but an octagonal cross-sectional entry pupil is preferred. The entry pupil area (cross-section) is in the range of 1.5:1 to 5:1 and most preferably in the range of 2:1 to 4:1, to the smallest area cross-section (vertical to axis 102) of the center section 103. The exit section 104 is also tapered and the exit pupil 105 is flat and rectangular (cross-section), as in the other embodiments. The center section 103 is integral with the exit section 104. In the prototype embodiment of FIG. 26, the entry pupil profile is flat and square (28 mm×28 mm) or preferably octagonal, and if octagonal the entry section transitions to a square flat which is connected to the center section. The entry section is 21 mm long. This embodiment is made of two pieces. At their connection they are both square (14 mm×14 mm). The second taper (center section and exit section) is 85 mm long and goes from square cross-section (14 mm×14 mm) to rectangular (24 mm×18 mm–30 mm diagonal) to match the aspect ratio of the image gate. Its total length is 106 mm. This is a "V-BLOCK" (TM) LPI.

The reflector-collector 106 is of the double ellipse type ("VAREX" reflector), described previously, in which the lamp's primary focal points $F_1$ and $F_2$ are directed to the secondary focal points $F_1'$ and $F_2'$; $E_1$ and $E_2$ are elliptical curves with the eccentricity of $E_2$ greater than the eccentricity of $E_1$, i.e., E=0.710 and E=0.730 and the radius of the reflector goes from 9.0 to 52.3 mm using an OSRAM 404 lamp. When the VAREX reflector is used with the FIG. 26 embodiment ("V-BLOCK") all rays over 6° will have at least one reflection. Typically, the lowest angles are 6–8°. An extra straight square mixing section (center section) between the two tapers may be used for additional mixing, if needed.

Collector optics are positioned with the lamp located on the optical axis. Such optical elements can be simple elliptical surfaces, but preferably are compound elliptical surfaces (that is, made of variable eccentricities and focal points). However, there are other approaches to designing the collector optic element which can meet the requirements imposed by the LPI element and the cone angle population set by the projection system. One such approach is to design a faceted reflector where each facet is directing the local rays in the proper direction towards the LIP element. Another approach involves the use of a combination of compound and faceted designs. For example, the preferred compound designs described above could be further improved by using a faceted approach rather than smooth curves. Such designs can be generated by computer programs and fabricated by glass molding techniques, similar to the way automobile headlights are made.

Modifications may be made in the present invention within the scope of the claims. For example, as shown in FIG. 23 the LPI (light pipe) is hollow has an entry section 71 and makes two 90-degree turns with a right angle prism 76,77 at each turn. The entry section 71 has a flat octagonal entry pupil (cross-section) and section 71 gradually changes from octagonal to rectangular in its cross-sections vertical to the optical axis. The entire light pipe 71a makes a 180° turn. The reflector 72 is pointed in the opposite direction from the rectangular face 73 of the LPI 74, which face 73 is proximate an LCD panel 75. In some cases using a turned light pipe may permit a shorter and more compact projector.

In the embodiment of FIG. 24 a double bulb system 80 is shown in which, if one bulb ceases to work, the alternative bulb is turned on. The circuit 81, when switched on, will first apply power to the first bulb 82. If it does not light, its dark condition is sensed in milliseconds by circuit 81, as it does not draw power. The circuit then applies power to the second bulb 83. When the first bulb is replaced, the circuit will gain apply power to the first bulb. In this embodiment the LPI (light pipe) is hollow and has two branches 84,85, each of which preferably is round or octagonal at its entry pupil cross-section (perpendicular to its turned center axis). The central section 91 of the LPI is rectangular (in cross-sections vertical to the optical axis). A right angle prism 92 is used to reflect the light from branches 84 or 85 into section 91. In addition, a light valve (not shown) may be provided in each branch 84,85 to prevent loss of light when the bulb at that branch is not illuminated. The rectangular face 88 of the light pipe 89 is proximate the film gate 90. This embodiment may be useful in motion picture projectors as the bulbs need be replaced less often.

What is claimed is:

1. A projector system comprising:
   lamp means to generate light;
   collector means to gather and re-direct the generated light;
   a light pipe having an entrance pupil, an exit pupil, a center section, reflective internal walls and an optical axis, the light from the collector means being directed on the entrance pupil;
   an image forming means to form an image and having an image gate, the exit pupil directing the light on the image gate; and
   a projector lens;
   characterized in that the light pipe is tapered in shape with the entrance pupil having an area whose ratio to the area of a cross-sectional perpendicular to the optical axis of the center section is at least 1 to 1.5.

2. A projector system as in claim 1 wherein the lamp means is a metal halide arc lamp having an arc gap in the range of 1–6 mm.

3. A projector system as in claim 1 wherein the light pipe reduces the cone angles of the light from the collector and produces light, at least 80% having cone angles below 10° (half-cone).

4. A projector system as in claim 2 wherein the collector means is a mirror reflector having a central axis and the arc gap is aligned along the reflector's central axis.

5. A projector system as in claim 2 wherein the collector means has a mirror internal wall and is a compound reflector having at least two elliptical curves having two different eccentricities.

6. A projector system as in claim 5 wherein the reflector is curved and concave in shape in cross-sections through the axis, and the curvature comprises at least two ellipses having different eccentricities and both eccentricities are in the range of 0.60–0.90 and is circular in cross-sections perpendicular to the axis.

7. A projector system as in claim 1 wherein the light pipe is hollow and has mirror internal walls.

8. A projector system as in claim 1 wherein the light pipe is of a solid transparent glass or plastic.

9. A projector system as in claim 1 wherein the image forming means is a LCD (Liquid Crystal Display) panel.

10. A projector system as in claim 9 and further including field optics comprising a Fresnel lens means to collimate the light, the Fresnel lens means being positioned between the exit pupil and the LCD panel and a Fresnel lens means to focus the image which is positioned between the LCD panel and the projector lens.

11. A projector system as in claim 1 wherein the entrance pupil cross-section is flat and octagonal and the exit pupil cross-section is flat and rectangular.

12. A projection system as in claim 1 wherein the light pipe is solid and the entrance pupil cross-section is a conical protrusion and the exit pupil is flat and rectangular.

13. A projector system as in claim 1 wherein the light pipe has an entry section which is round in cross-sections and is at least one-third of the length of the light pipe.

14. A projection system as in claim 1 wherein the light pipe has an entry section having uniform cross-sections which is at least one-third the length of the light pipe.

15. A projector system as in claim 1 and relay optic means to form a cone-shaped beam from the light from the collector means and to direct the beam on the entrance pupil.

16. A projector system as in claim 1 wherein the light pipe has an optical axis and has an entry section, the system having a lamp means and a collector means to direct light at the entrance pupil, the entry section being round in cross-sections.

17. A projector system comprising:
a metal halide arc lamp having an arc gap in the range of 1–6 mm;
an elliptical reflector having a central axis, the lamp being positioned at the reflector's axis;
a relay optic lens means to form a conical beam from light collected by the reflector;
a hollow light pipe having an optical axis, a square cross-section shaped entrance pupil, a rectangular exit pupil, a central section between the entrance and exit pupils, reflecting walls, and a double tapered shape in which the exit pupil and entrance pupil each is at least 50% larger than the area of a cross-section of the central section taken perpendicular to the optical axis;
a LCD (Liquid Crystal Display) panel; and
a projector lens means to project images formed by the LCD panel onto a screen.

18. A light engine for an optical projector system comprising:
lamp means to generate light;
collector means to collect and direct the generated light; and
a light pipe having an entrance pupil, a central section, an exit pupil along a straight optical axis, and reflecting walls; characterized in that
the light pipe is double tapered with the exit pupil being rectangular and the area of the exit pupil and entrance pupil each being at least 50% larger than a cross-sectional area perpendicular to the optical axis of the center section.

19. A light engine as in claim 18 wherein the lamp means is a metal halide arc lamp having an arc gap in the range of 1–6 mm.

20. A projector system as in claim 19 wherein the collector means is an elliptical mirror reflector having a central axis and the arc gap is located at the reflector central axis.

21. A light engine as in claim 20 wherein the light pipe has an optical axis and an entry section which is round in all cross-sections perpendicular to the optical axis and is at least one-third of the length of the light pipe.

22. A projector system comprising:
lamp means to generate light;
collector optics means to gather and direct the generated light;
a light pipe having an entrance pupil, an exit pupil, reflective internal walls, a center section between the entrance and exit pupils, and an optical axis, the light from the collector means being directed on the entrance pupil;
an image forming means to form an image and having an image gate; and
a projector lens;
characterized in that the light pipe is double tapered in shape with the entrance pupil and exit pupil each having an area whose ratio to the area of a cross-section of the center section is at least 1.5:1 and that the collector optics means comprises a compound reflector having an optical axis, the reflector having a curvature whose cross-sections through the optical axis are segments of at least two different curves.

23. A projector system as in claim 22 wherein the lamp means is a plasma arc lamp having an arc gap in the range of 1–6 mm.

24. A projector system as in claim 22 wherein the lamp means is a metal halide arc lamp or an incandescent lamp.

25. A projector system as in claim 23 wherein the arc gap is aligned with the reflector optical axis.

26. A projector system as in claim 22 wherein the two different curves are ellipses having two different eccentricities and with two different focal lengths which are ±2 mm from a central focal point.

27. A projector system as in claim 22 wherein the reflector has a mirror internal wall, a back closed end portion having an elliptical curve with a first eccentricity and an open end portion having an elliptical curve with a second eccentricity which is larger than the first eccentricity.

28. A projector system as in claim 22 wherein the light pipe is hollow and the image forming means is a LCD (Liquid Crystal Display) panel.

29. A projector system as in claim 22 wherein the entrance pupil is octagonal and the exit pupil is rectangular.

30. A projector system as in claim 22 wherein the light pipe has an entry section having an axis and is octagonal in cross-section taken vertical to the axis and the entry section is at least one-third of the length of the light pipe.

31. A projector system as in claim 22 and relay optic means to form a cone-shaped beam from the light from the collector means and to direct the beam on the entrance pupil.

32. A projector system as in claim 22 wherein the lamp means is a xenon arc lamp or a halogen lamp.

33. A projector system comprising:
(a) a metal halide arc lamp having an arc gap in the range of 1–6 mm;
(b) a reflector having a central axis, the lamp arc gap being along the reflector's axis;
the reflector being circular in cross-sections perpendicular to the central axis and being curved in at least two elliptical curves having different eccentricities in cross-sections through the central axis;
(c) a relay optic lens means to form a conical beam from light collected by the reflector;

(d) a hollow light pipe having an entrance pupil, a rectangular exit pupil, a center section between the entrance and exit pupils, an optical axis, reflecting walls, and a tapered shape in which the exit pupil is at least 50% larger than the area of a cross-section of a center section taken perpendicular to the optical axis;

(e) a LCD (Liquid Crystal Display) panel illuminated by light from the exit pupil; and (f) a projector lens means to project images formed by the LCD panel onto a screen.

34. A projector system as in claim 33 wherein the elliptical curves each have a different focal point.

35. A projector system as in claim 33 wherein each of the elliptical curves are formed around the same apex point.

* * * * *